United States Patent
Tsuchiya

(10) Patent No.: US 10,666,833 B2
(45) Date of Patent: May 26, 2020

(54) INFORMATION PROCESSING APPARATUS, METHOD OF CONTROLLING THE SAME, AND STORAGE MEDIUM, FOR CONTROLLING WIRELESS COMMUNICATIONS OF A FIRST COMMUNICATION FUNCTION AND A SECOND COMMUNICATION FUNCTION

(71) Applicant: CANON KABUSHIKI KAISHA, Tokyo (JP)

(72) Inventor: Masato Tsuchiya, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/242,087

(22) Filed: Jan. 8, 2019

(65) Prior Publication Data
US 2019/0141212 A1 May 9, 2019

Related U.S. Application Data

(63) Continuation of application No. 15/666,624, filed on Aug. 2, 2017, now Pat. No. 10,218,876.

(30) Foreign Application Priority Data

Aug. 17, 2016 (JP) ................................. 2016-160217

(51) Int. Cl.
*H04W 88/00* (2009.01)
*H04W 88/08* (2009.01)
(Continued)

(52) U.S. Cl.
CPC .......... *H04N 1/33353* (2013.01); *H04B 7/15* (2013.01); *H04N 1/00307* (2013.01);
(Continued)

(58) Field of Classification Search
USPC ............ 358/1.1–3.29, 1.11–1.18, 426.08, 43
See application file for complete search history.

(56) References Cited

U.S. PATENT DOCUMENTS 9,585,184 B1 2/2017 Sheriff
9,826,447 B2 11/2017 Sakai
(Continued)

FOREIGN PATENT DOCUMENTS

JP 2013115806 A 6/2013
JP 2014179929 A 9/2014

OTHER PUBLICATIONS

Office Action issued in U.S. Appl. No. 15/666,624 dated Dec. 12, 2017.
(Continued)

*Primary Examiner* — Marcellus J Augustin
(74) *Attorney, Agent, or Firm* — Rossi, Kimms & McDowell LLP

(57) ABSTRACT

An information processing apparatus comprises a first interface that performs wireless communication relayed through a base station and a second interface that performs wireless communication not relayed through a base station, and the information processing apparatus allows the wireless communication by the second interface to start under a condition that the wireless communication by the first interface has been started so that it is possible to set the same frequency channel used in the two types of wireless communication.

13 Claims, 9 Drawing Sheets

(51) Int. Cl.
  *H04W 92/10* (2009.01)
  *H04N 1/333* (2006.01)
  *H04N 1/00* (2006.01)
  *H04N 1/327* (2006.01)
  *H04B 7/15* (2006.01)
  *H04W 84/18* (2009.01)

(52) U.S. Cl.
  CPC ........ *H04N 1/32776* (2013.01); *H04W 84/18* (2013.01); *H04N 1/00474* (2013.01); *H04N 2201/0094* (2013.01); *H04N 2201/33392* (2013.01)

(56) References Cited

U.S. PATENT DOCUMENTS

| | | |
|---|---|---|
| 9,900,771 B2 | 2/2018 | Ikeda |
| 2004/0156336 A1 | 8/2004 | McFarland et al. |
| 2006/0073847 A1 | 4/2006 | Pirzada et al. |
| 2010/0165882 A1 | 7/2010 | Palanki et al. |
| 2013/0142170 A1 | 6/2013 | Sakai |
| 2013/0148149 A1 | 6/2013 | Park |
| 2013/0272224 A1 | 10/2013 | Ogawara |
| 2014/0320909 A1* | 10/2014 | Shimazaki ............ H04W 8/005 358/1.15 |
| 2016/0028918 A1* | 1/2016 | Inoue .................... G06F 3/1292 358/1.15 |
| 2016/0037439 A1 | 2/2016 | Shamis et al. |
| 2016/0373606 A1* | 12/2016 | Ito ...................... H04N 1/32106 |
| 2017/0055262 A1* | 2/2017 | Nakamura ........ H04W 72/0453 |

OTHER PUBLICATIONS

Office Action issued in U.S. Appl. No. 15/666,624 dated Jul. 23, 2018.
Notice of Allowance issued in U.S. Appl. No. 15/666,624 dated Oct. 2, 2018.
Office Action issued in Japanese Appln. No. 2016-160217 dated Feb. 28, 2020. English translation provided.

* cited by examiner

INFORMATION PROCESSING APPARATUS, METHOD OF CONTROLLING THE SAME, AND STORAGE MEDIUM, FOR CONTROLLING WIRELESS COMMUNICATIONS OF A FIRST COMMUNICATION FUNCTION AND A SECOND COMMUNICATION FUNCTION

BACKGROUND OF THE INVENTION

Field of the Invention

The present invention relates to an information processing apparatus, a method of controlling the same, and a storage medium.

Description of the Related Art

In recent years, many household appliances and office devices have a wireless communication function, and within family homes, connection to a wireless LAN or the Internet is possible. Also, an image forming apparatus such as a printer unit or a multi-function peripheral is not an exception, and connecting with a mobile terminal or a laptop computer wirelessly to receive print jobs from these and print in accordance therewith, or perform a device setting wirelessly has become common.

Furthermore, information processing devices having a plurality of coexisting wired/wireless interfaces called multihome are increasing. In a wireless interface specifically, it is possible to achieve both communication that relays through a base station (access point) according to an infrastructure mode and communication, by an ad hoc mode, that does not relay through the base station. In a multihome environment, an adjustment of both infrastructure mode and ad hoc mode frequency channels becomes a problem. For example, in Japanese Patent Laid-Open No. 2013-115806, it is recited that it is determined whether or not a frequency channel for which a current ad hoc mode is being used matches with the frequency channel of an existing access point, and an access point that is connected to is changed in accordance with the result of the determination.

Depending on the hardware circuit used in the wireless communication, a restriction is put in place such that the infrastructure mode and ad hoc mode of Wi-Fi wireless communication must use the same frequency channel. In a multihome environment operating under this restriction, there is a possibility that the frequency channel that the ad hoc mode is using and the frequency channel of an access point in a usage area are different in a case when the ad hoc mode starts prior to the infrastructure mode. In such a case, if the ad hoc mode is not stopped temporarily, it becomes impossible to connect to the access point by the infrastructure mode. In such a case, there is a problem in that it becomes impossible to continue communication by the ad hoc mode and usability is poor.

SUMMARY OF THE INVENTION

An aspect of the present invention is to eliminate the above-mentioned problem with conventional technology.

A feature of the present invention is to provide a technique by which it is possible to guarantee that in wireless communication, a frequency channel of wireless communication performed by relaying through a base station and wireless communication that is not relayed through the base station are the same.

According to a first aspect of the present invention, there is provided an information processing apparatus, comprising: a memory storing a set of instructions; and one or more processors that execute instructions of the set of the instructions and cause the information processing apparatus to function as: a first interface configured to perform wireless communication relayed through a base station; a second interface configured to perform wireless communication not relayed through a base station; and a control unit configured to control to allow wireless communication by the second interface to start under a condition that wireless communication by the first interface has been started.

According to a second aspect of the present invention, there is provided a method of controlling an information processing apparatus having a first interface that performs wireless communication which is relayed through a base station and a second interface that performs wireless communication which is not relayed through a base station, the method comprising: controlling to allow wireless communication by the second interface to start under a condition that wireless communication by the first interface has been started.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that a wireless LAN mode according to the embodiment is a mode for allowing an MFP 101 to connect in the infrastructure mode to an access point connected to a user's backbone network and a wired LAN mode is a mode for causing a connection to the backbone network similarly by wire. Also, a wireless software AP mode is one part of an ad hoc mode, and is a mode in which it is possible to allow a mobile terminal to connect to the MFP 101 by the MFP 101 functioning as a pseudo-access point under the control of software.

Figure 1:
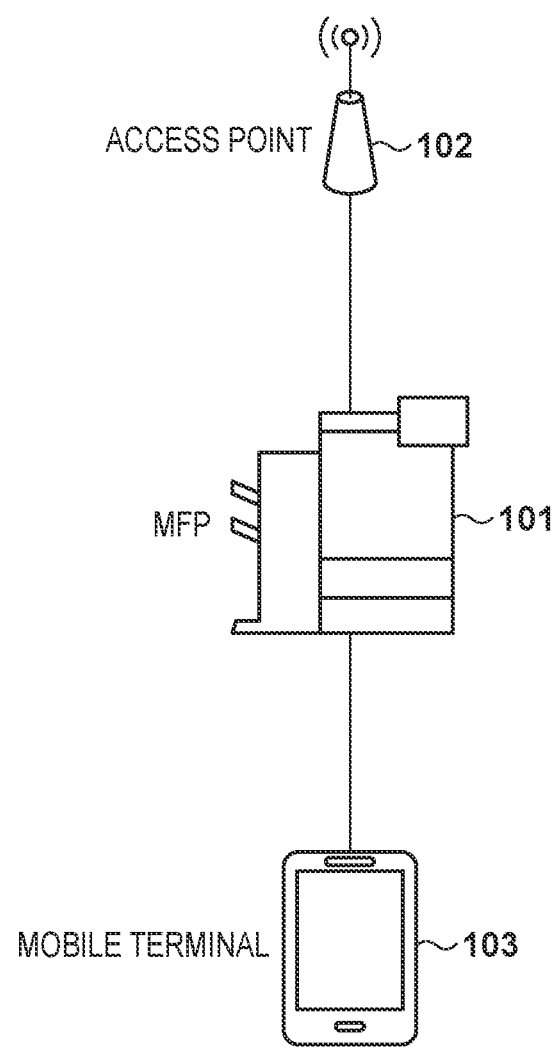
FIG. 1 depicts a view for describing a configuration of an information processing system according to an embodiment of the present invention.

FIG. 1 depicts a view for describing a configuration of an information processing system according to an embodiment of the present invention.

The information processing system according to the embodiment includes an access point 102 connected to the backbone network of the user environment, the MFP (multi-function peripheral) 101 connected to the access point 102, and a mobile terminal 103 which wirelessly connects to the MFP 101. The mobile terminal 103 is described as something that wirelessly connects to the MFP 101 which is functioning as a pseudo access point in the wireless software AP mode.

In FIG. 1, although only one access point is illustrated, a plurality of access points are often arranged in an actual user environment. Also, in the example, although the information processing apparatus of the present invention is described in the example as a multi-function peripheral (MFP) which is one example of an image forming apparatus, the information processing apparatus of the present invention is not limited to this and may be a personal computer, a mobile terminal, or the like for example.

Figure 2:
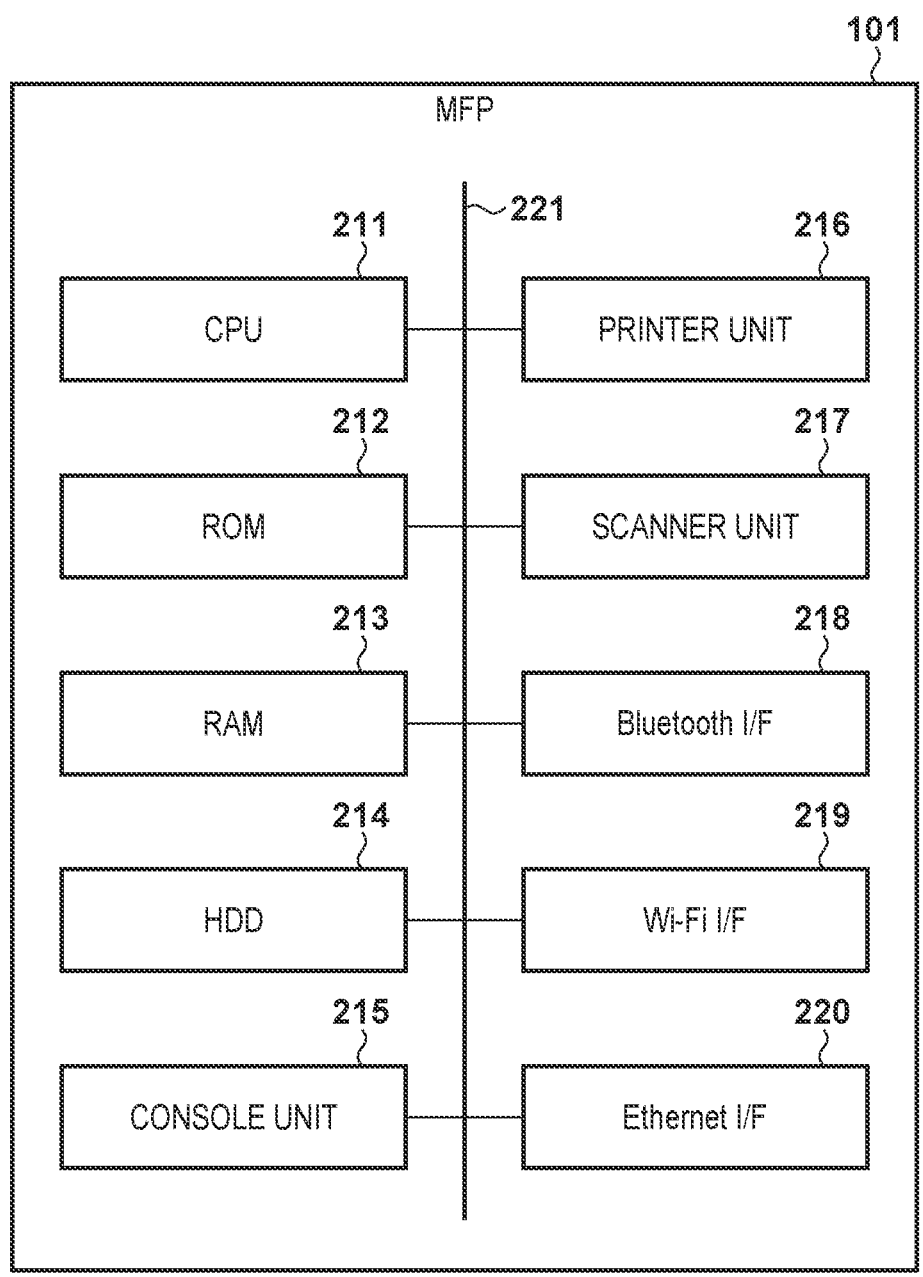
FIG. 2 is a block diagram for describing a hardware configuration of an MFP according to an embodiment.

FIG. 2 is a block diagram for describing a hardware configuration of the MFP 101 according to the embodiment.

A CPU 211 controls operations of the whole MFP 101. The CPU 211 performs various control such as reading control or transmission control by executing a program. The CPU 211 executes a boot program stored in a ROM 212 and deploys a program recorded in an HDD (hard disk drive) 214 into a RAM 213 and executes the deployed program to control the whole MFP 101. The RAM 213 is a volatile memory used as a work area or the like for the CPU 211 to execute various programs. The HDD 214 stores image data and various programs. A console unit 215 is equipped with various hard keys or a display unit that operates as a touch panel capable of operation by a finger of the user. A printer unit 216 prints an image on a sheet in accordance with image data transferred via an internal bus 221. A scanner unit 217 generates image data by reading an original image. A Bluetooth (registered trademark) I/F 218 is an interface for performing wireless communication by a Bluetooth standard, and performs communication between other devices that have a Bluetooth I/F. In the embodiment, the MFP 101 performs two-way communication with the mobile terminal 103 by a Bluetooth standard. A Wi-Fi I/F 219 and an Ethernet (registered trademark) I/F 220 are NICs (Network Interface Card) for connecting to a network wirelessly and by wire respectively. Each unit described above is connected by the internal bus 221 and can perform a two-way exchange of data and the like.

Figure 3:
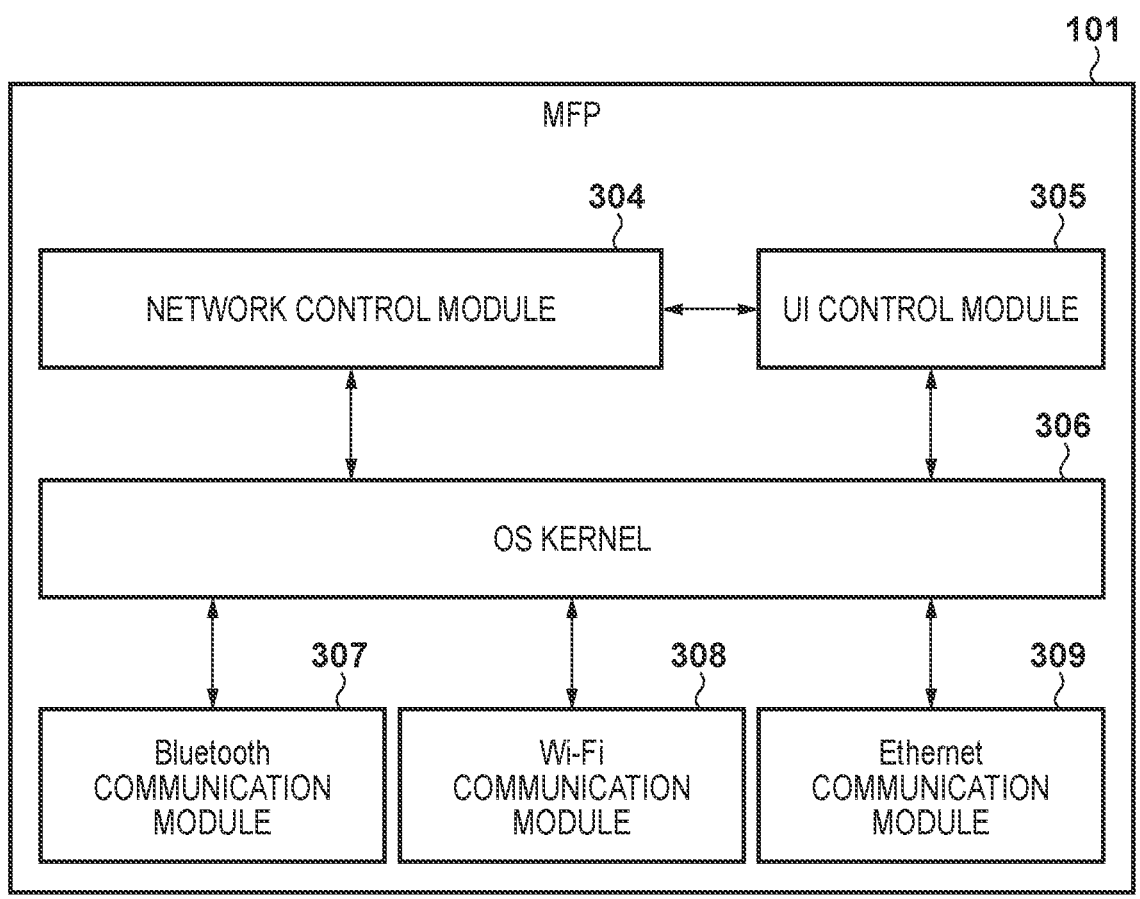
FIG. 3 is a functional block diagram for explaining a software configuration of an MFP according to an embodiment.

FIG. 3 is a functional block diagram for explaining a software configuration of the MFP 101 according to the embodiment. Functions illustrated in the block diagram are realized by the foregoing CPU 211 executing programs deployed in the RAM 213.

A Wi-Fi communication module 308 is a module for controlling the Wi-Fi I/F 219 and a Bluetooth communication module 307 is a module for controlling the Bluetooth I/F 218. Similarly, an Ethernet communication module 309 controls the Ethernet I/F 220. These modules are controlled by an OS kernel 306. A network control module 304 operates each communication control unit of Bluetooth and Wi-Fi via the OS kernel 306. Also, the network control module 304 manages current network settings and manages whether or not modes of each of Ethernet (wired LAN), wireless LAN, and wireless software AP are enabled. In the example, although the wired LAN and the wireless LAN operate exclusively, the wireless software AP mode which is an ad hoc mode in which the MFP 101 functions as a pseudo access point is independent. Accordingly, it is possible to simultaneously set the infrastructure mode and the wireless software AP mode. The network control module 304 performs transmission of information with a UI control module 305 which controls the console unit 215, changes the UI display that is displayed on the console unit 215, and conversely performs control of the network depending on an operation request from the UI.

First Embodiment

Figure 7:
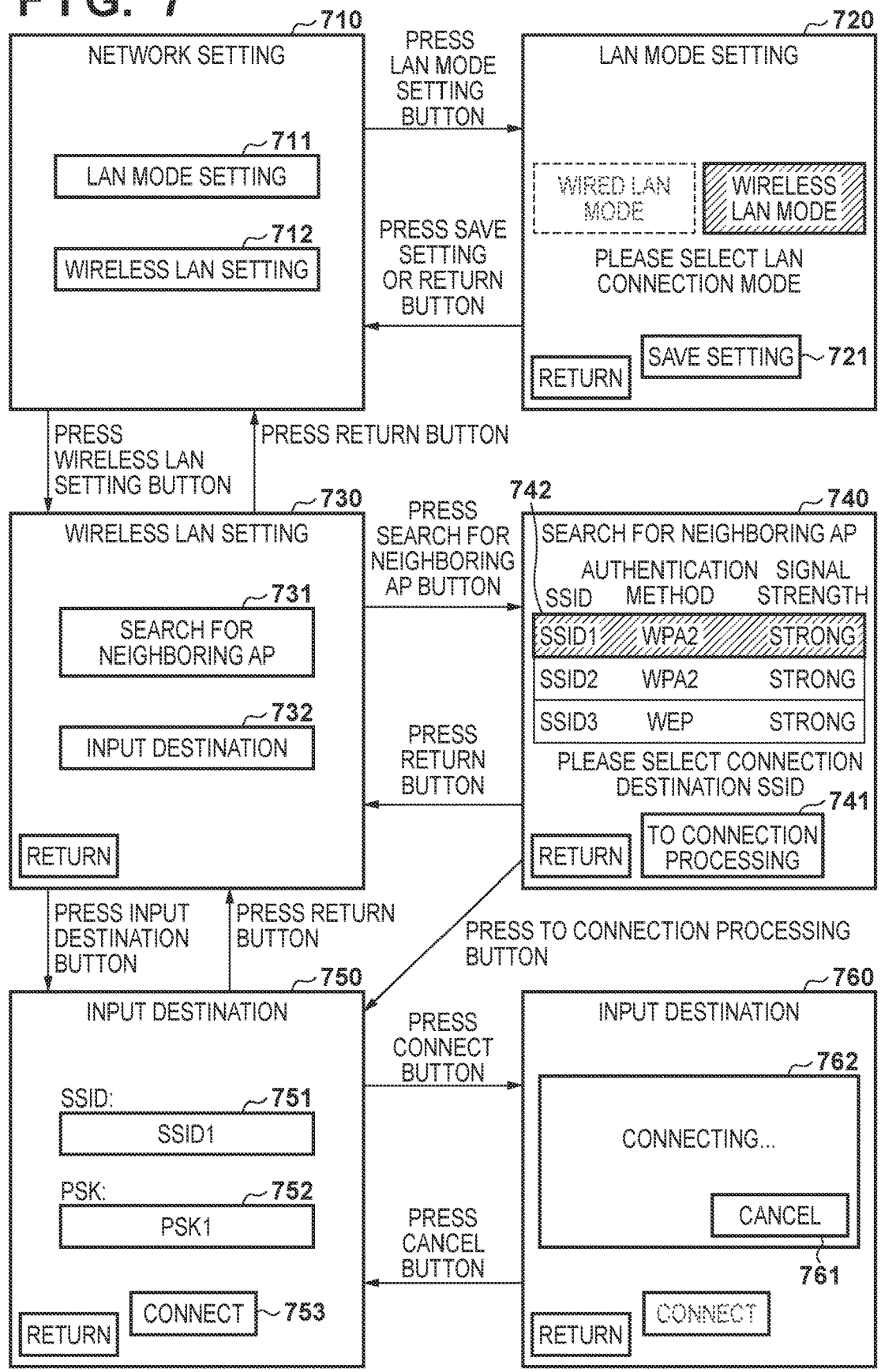
FIG. 7 depicts a view for describing user interface screen transitions for switching the MFP between wired LAN/wireless LAN mode and performing a wireless LAN connection according to the first embodiment of the present invention.

FIG. 7 depicts a view for describing user interface screen transitions for switching the MFP 101 between wired LAN/wireless LAN mode and performing a wireless LAN connection according to the first embodiment of the present invention.

Firstly, a network setting screen 710 is displayed on the console unit 215 when a user performs a network setting of the MFP 101. A LAN mode setting screen 720 is transitioned to when the user presses a LAN mode setting button 711 on the screen 710. The LAN mode setting screen 720 is for setting one of the wired LAN and wireless LAN modes, and the wireless LAN mode is selected in the example of the screen 720. The wireless LAN mode selected in the screen 720 is set and saved, and the network setting screen 710 is returned to when the user presses a "save setting" button 721 in the LAN mode setting screen 720.

A "wireless LAN setting" button 712 of the network setting screen 710 is activated only in a case when the wireless LAN mode is selected and the wireless LAN mode is set in the LAN mode setting screen 720. When the user presses the "wireless LAN setting" button 712 in the network setting screen 710, it transitions to a wireless LAN setting screen 730 for setting a connection destination of the wireless LAN.

There are two ways to set wireless LAN here: a method of searching for a neighboring AP (access point) and setting its SSID (network identifier), and a method of directly inputting and setting an SSID itself. A neighboring AP search screen 740 is transitioned to when the user presses a "search for neighboring AP" button 731 on the wireless LAN setting screen 730. In the neighboring AP search screen 740, a list 742 of access points that are based on neighboring wireless LAN connection destination access point scan results is displayed. The user selects an access point to which the user desires to wirelessly connect from the list 742 in the search screen 740 of neighboring APs (in the example of FIG. 7, SSID 1 is selected). Also, an input destination screen 750 is transitioned to when the user presses a "to connection processing" button 741 in the search screen 740.

Also, the input destination screen 750 is transitioned to when the user presses an "input destination" button 732 for directly inputting and setting an SSID itself on the wireless LAN setting screen 730. The input destination screen 750 is for setting an actual connection destination by an SSID and a PSK (pre-shared authentication key). In a case when the "input destination" button 732 is pressed on the wireless LAN setting screen 730 and the input destination screen 750 is transitioned to, an SSID input text field 751 and a PSK input text field 752 are blank. Meanwhile, in a case of having transitioned from the neighboring AP search screen 740, the SSID selected on the search screen 740, and, if it is an SSID to which a connection was once made, also a PSK that is stored already are displayed in a state in which they are set in advance in the input text fields 751 and 752 respectively. Note that the PSK is displayed as asterisks here for security reasons. The user inputs the SSID and the PSK to the SSID input text field 751 and the PSK input text field 752 respectively in a case of having transitioned upon pressing the "input destination" button 732.

Also, when the "connect" button 753 is pressed in the input destination screen 750, values set in the input text fields 751 and 752 at that point in time are made to be the connection destination information, wireless LAN connection processing is initiated, and a screen 760 is transitioned to. In the screen 760, a pop-up 762 is displayed and it is notified to the user that the wireless LAN connection processing is in progress. Here, when the user presses a cancel button 761, the wireless LAN connection processing can be cancelled.

In this way, a user of the MFP 101 is able to select whether to connect the MFP 101 to a wired LAN or to connect to a wireless LAN in the infrastructure mode.

Figure 8:
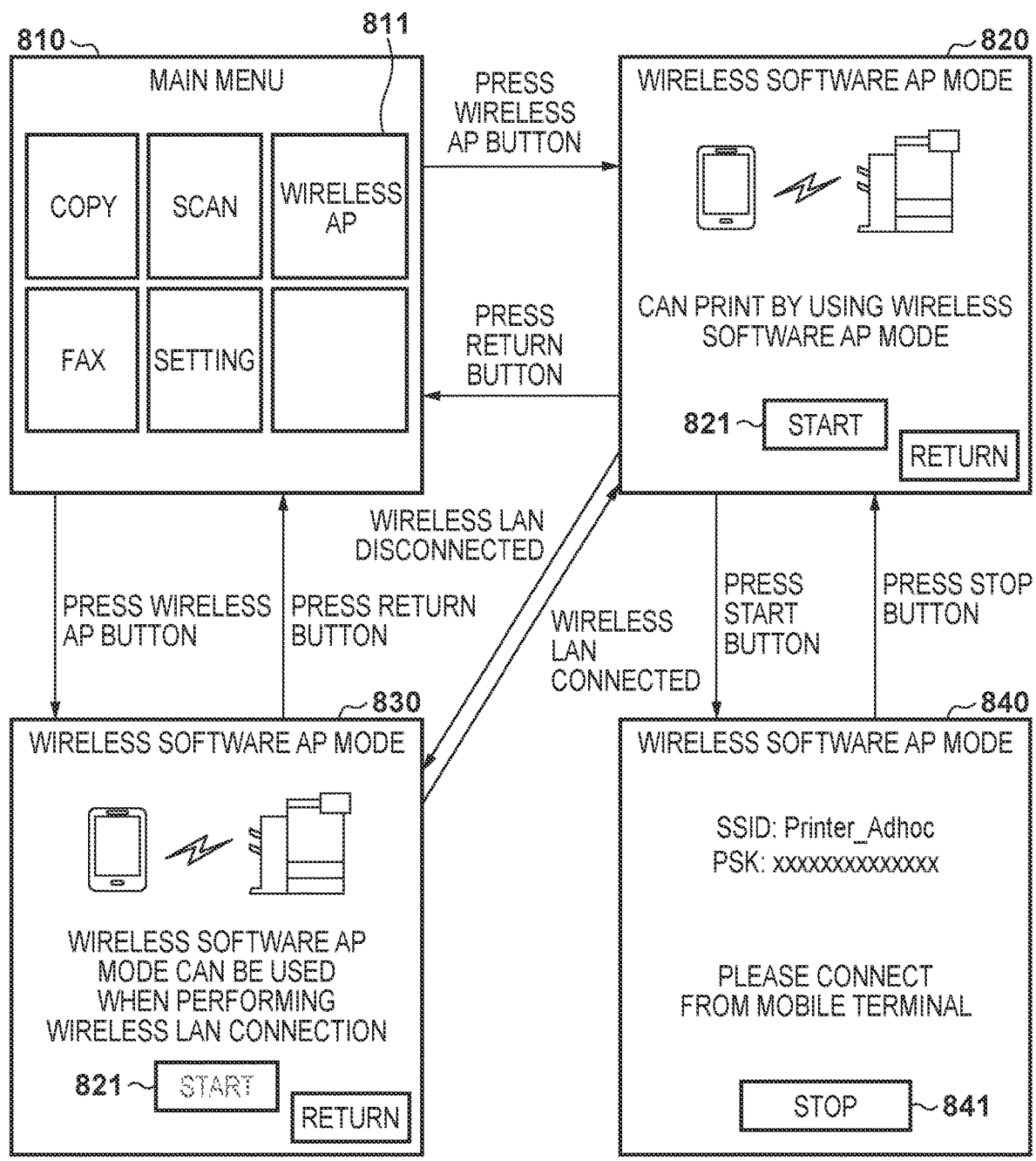
FIG. 8 depicts a view for describing user interface screen transitions in the MFP according to the first embodiment.

FIG. 8 depicts a view for describing user interface screen transitions in the MFP 101 according to the first embodiment.

A wireless AP button 811 of a main menu screen 810 is a button for instructing wireless communication by an ad hoc mode (wireless software AP mode) in which the MFP 101 functions as a pseudo access point. When the user of the MFP 101 presses the wireless AP button 811 in the main menu screen 810 initially displayed, a wireless software AP mode screen 830 is displayed in a case when the MFP 101 is not connected to the wireless LAN. In the screen 830, a wireless software AP mode start button 821 is disabled and the wireless software AP mode cannot be allowed to start.

Meanwhile, a wireless software AP mode screen 820 is displayed in a case when the MFP 101 is connected to the wireless LAN when the wireless AP button 811 is pressed. In the screen 820, because the start button 821 of the wireless software AP mode is enabled, the wireless software AP mode can be started by the user pressing the button 821. Also, when the MFP 101 connects to the wireless LAN while the wireless software AP mode screen 830 is being displayed, the wireless software AP mode screen 820 is transitioned to, and thereby it becomes possible to start the wireless software AP mode.

A wireless software AP mode screen 840 is transitioned to when the start button 821 is pressed in the wireless software AP mode screen 820, and the wireless software AP mode is thereby started. In this state, each wireless terminal can use the SSID and PSK displayed on the screen 840 to wirelessly connect to the MFP 101 by the ad hoc mode. In the wireless software AP mode screen 840, when the user presses a stop button 841, the wireless software AP mode stops and the wireless software AP mode screen 820 is returned to.

In this way, the user of the MFP 101 can set so that wireless communication with the wireless terminal is possible by causing the MFP 101 to transition from the main menu screen to the ad hoc mode in which the MFP 101 functions as a pseudo access point.

Also, the MFP 101, when not wirelessly connected in the infrastructure mode, prohibits a transition to the wireless software AP mode in which the MFP 101 functions as a pseudo access point. By this, a possibility of using different frequency channels between the infrastructure mode and the ad hoc mode is eliminated.

Figure 4:
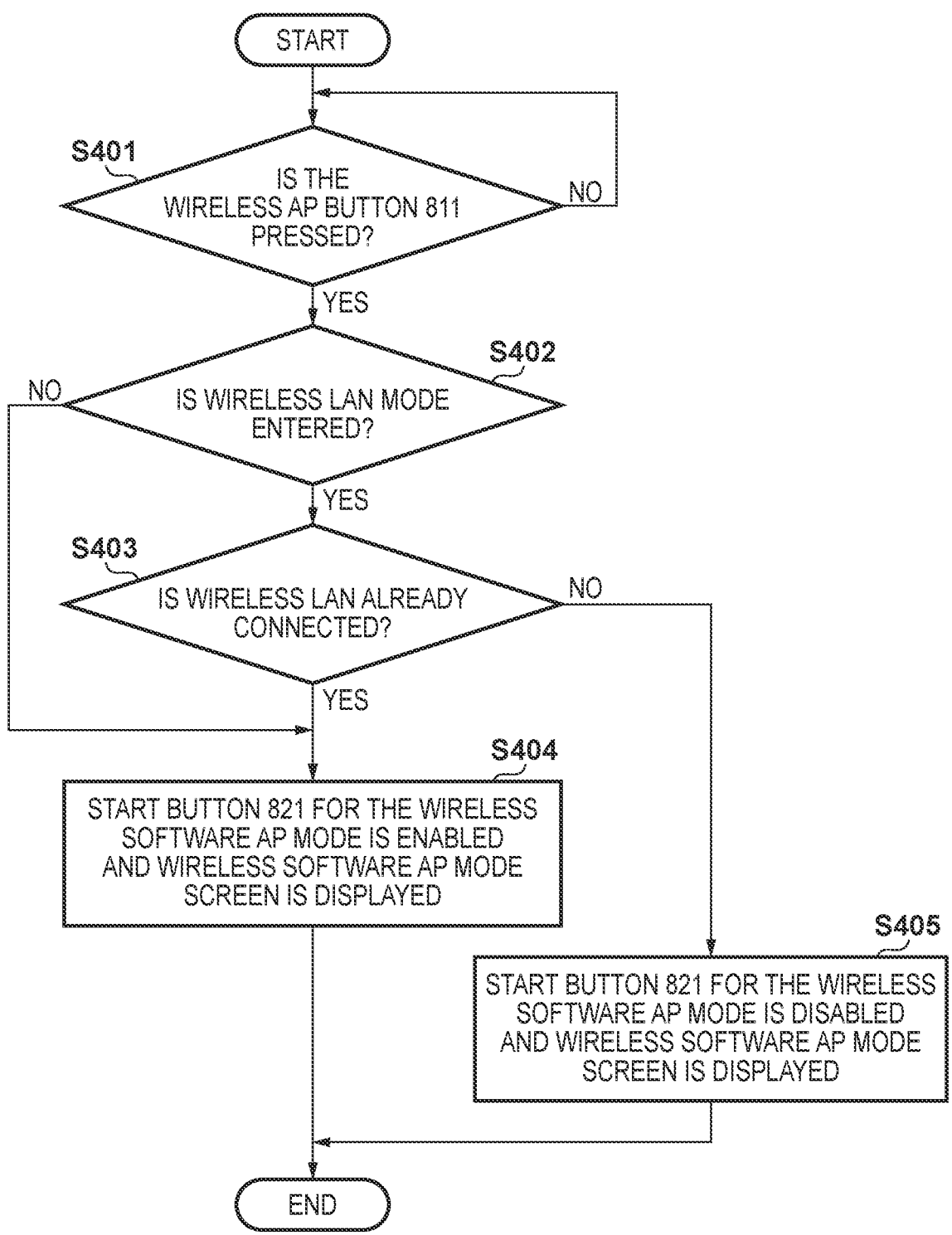
FIG. 4 is a flowchart for describing processing by the MFP according to a first embodiment.

FIG. 4 is a flowchart for describing processing by the MFP 101 according to the first embodiment. Here, description is given for an example of restricting a start of the wireless software AP mode in order to cause the same frequency channel to be used between the wireless LAN mode (infrastructure mode) and the wireless software AP mode. Note, the wireless software AP mode is stopped when this flowchart is initiated. Also, this processing is achieved by the CPU 211 executing the program deployed in the RAM 213 from the HDD 214.

Firstly, in step S401 the CPU 211 functions as the UI control module 305 and determines whether or not the wireless AP button 811 in the main menu screen 810 of FIG. 8 is pressed. Here, when it is determined that the wireless AP button 811 was pressed, the processing proceeds to step S402, and the CPU 211 functions as the network control module 304, and determines whether or not the LAN mode is the wireless LAN mode (infrastructure mode). Here, when the wireless LAN mode is determined, the processing proceeds to step S403, and the CPU 211 functions as the network control module 304, and determines whether or not the wireless LAN is already connected to the access point 102 of the user environment. Here, when it is determined to be already connected, the processing proceeds to step S404, and the CPU 211 permits a start of the wireless software AP mode, and displays the wireless software AP mode screen 820 in which the start button 821 for the wireless software AP mode is enabled. Also, when the LAN mode is not the wireless LAN mode in step S402, the processing proceeds to step S404, and the CPU 211 permits a start of the wireless software AP mode and displays the wireless software AP mode screen 820, in which the start button 821 for the wireless software AP mode is enabled.

Meanwhile, if the CPU 211 determines in step S403 that the wireless LAN is not connected to any access point in the wireless LAN mode, the processing proceeds to step S405. In such a case, the CPU 211 in step S405 prohibits the start of the wireless software AP mode because the frequency channel to be used has not been determined. Then, the CPU 211 displays the wireless software AP mode screen 830, in which the wireless software AP mode start button 821 is disabled, and the processing terminates.

In this way, it is possible to make the frequency channels used by the two modes the same by permitting a transition to the wireless software AP mode which is one part of the ad hoc mode under the condition that the MFP is wirelessly connected in the infrastructure mode.

Figure 5:
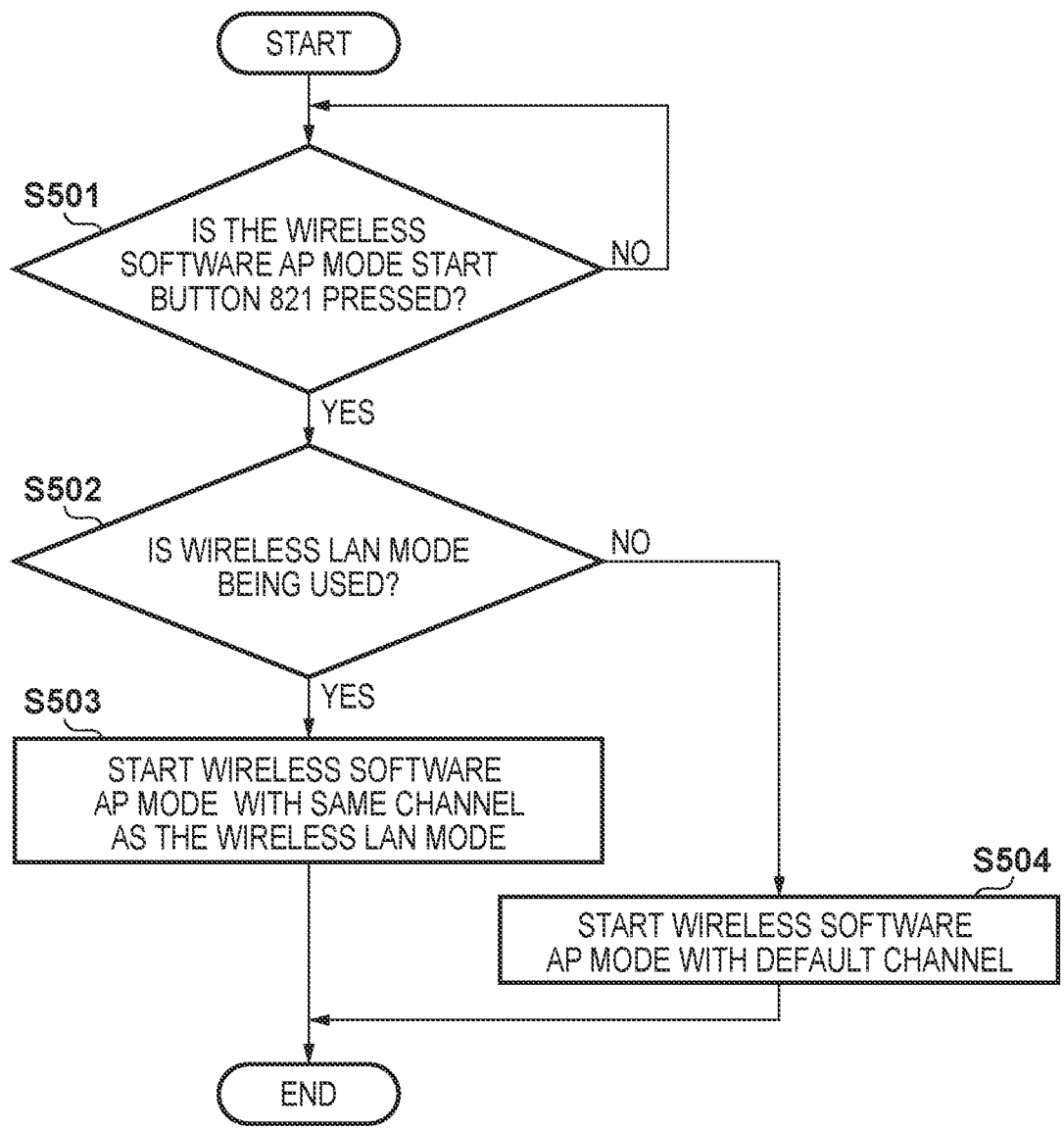
FIG. 5 is a flowchart for describing processing when the MFP according to the first embodiment starts by a wireless software AP mode.

FIG. 5 is a flowchart for describing processing when the MFP 101 according to the first embodiment starts in the wireless software AP mode. When the flowchart is initiated, the MFP 101 is assumed to be displaying the wireless software AP mode screen 820 in which he wireless software AP mode start button 821 is enabled. Also, this processing is achieved by the CPU 211 executing a program deployed in the RAM 213 from the HDD 214.

Firstly, in step S501 the CPU 211 functions as the UI control module 305 and determines whether or not the wireless software AP mode start button 821 is pressed. Here, when it is determined that the start button 821 is pressed, the processing proceeds to step S502, and the CPU 211 functions as the network control module 304, and determines whether or not the wireless LAN mode is being used. In a case when it is determined that the wireless LAN mode is being used here, the processing proceeds to step S503, and the CPU 211 uses the same frequency channel as the frequency channel used by the wireless LAN mode to start the wireless software AP mode, and the processing terminates.

Meanwhile, in step S502, if the CPU 211 determines that the wireless LAN mode is not being used, the processing proceeds to step S504 and the CPU 211 functions as the network control module 304, starts the wireless software AP mode with a channel value that is held by default, and terminates the processing. Note, the default channel value here is "10" for example, and this default value can be set by a user (administrator) in a range of "1" through "14".

By virtue of the first embodiment, as described above, it is possible to prevent the frequency channels in the two modes being different by permitting wireless communication by the wireless software AP mode in the same frequency channel in a case when the infrastructure mode has been started first.

Also, if the infrastructure mode is already started when the wireless software AP mode starts, the same frequency channel as the frequency channel used in that infrastructure mode is used to start the wireless software AP mode. By this, the frequency channels used in the two modes can be made to be the same.

Second Embodiment

Next, a second embodiment of the present invention will be described. Note that, description of the system configuration, the configuration of the MFP 101, and the like according to the second embodiment is omitted because they are the same as in the foregoing first embodiment.

Figure 6:
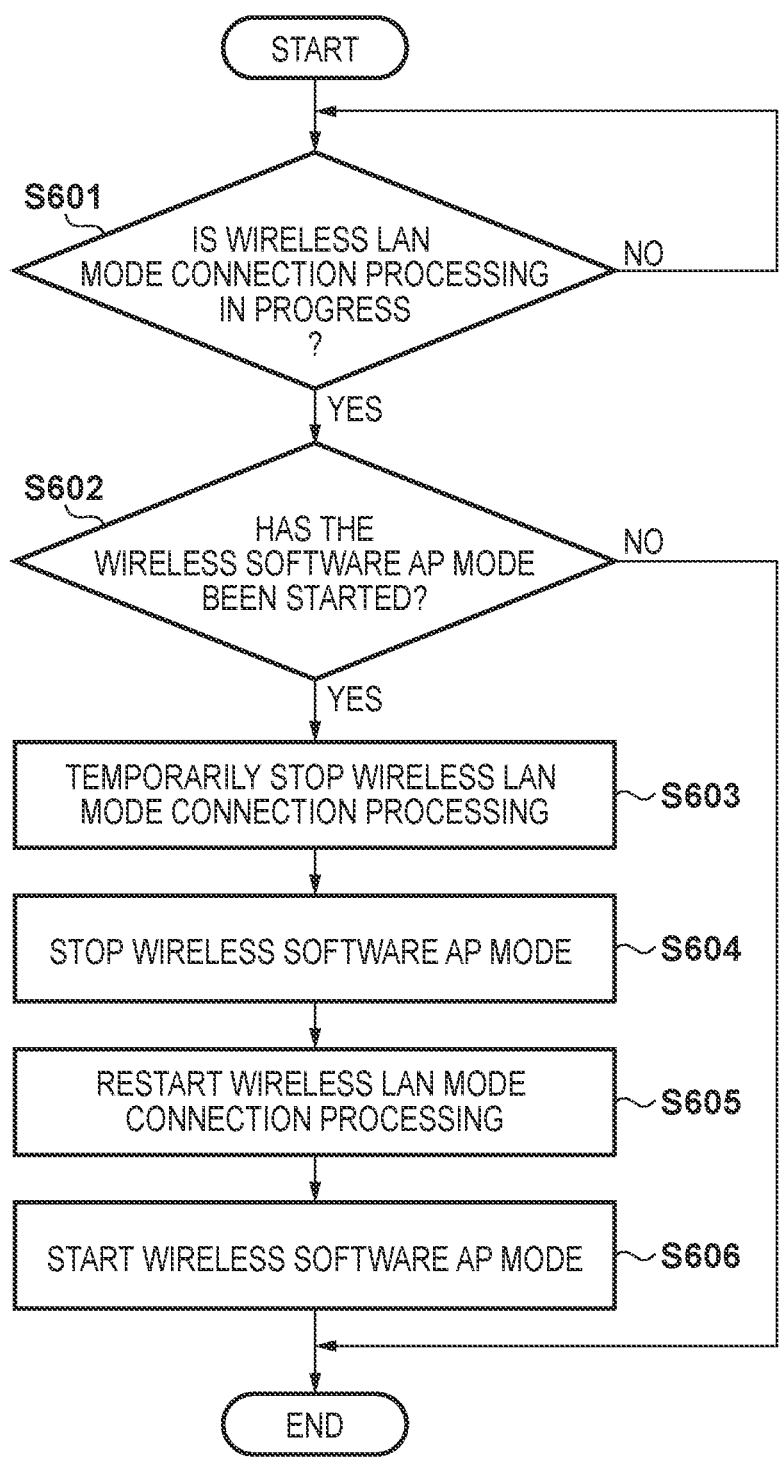
FIG. 6 is a flowchart for describing processing when the MFP according to a second embodiment performs a wireless software AP mode restart.

FIG. 6 is a flowchart for describing processing when the MFP 101 according to the second embodiment performs a restart in the wireless software AP mode. When this flowchart is initiated, it is assumed that the infrastructure mode (wireless LAN mode) is disconnected. Also, this processing is achieved by the CPU 211 executing the program deployed in the RAM 213 from the HDD 214.

Firstly, in step S601 the CPU 211 is displaying a wireless software AP mode screen 910 or 920 (FIG. 9) for the wireless software AP mode on the console unit 215. Then, the CPU 211 functions as the network control module 304 and determines whether or not connection processing in the wireless LAN mode is being executed. In a case when it is determined that connection processing is being executed here, the processing proceeds to step S602, and the CPU 211 functions as the network control module 304, and determines whether or not the wireless software AP mode is started. When it is determined that the wireless software AP mode has not been started here, the processing terminates. When it is determined that the wireless software AP mode is started in step S602, there is the possibility that the wireless LAN mode which is currently in the process of connection processing is started with a frequency channel that is different to the frequency channel of the connection in the wireless software AP mode. Accordingly, the CPU 211 advances the processing to step S603, functions as the network control module 304, and temporarily stops the connection processing of the wireless LAN mode. Next, the processing proceeds to step S604, and the CPU 211 functions as the network control module 304, and causes the wireless software AP mode to also stop. Next, the processing proceeds to step S605, and the CPU 211 functions as the network control module 304, and restarts connection processing in the wireless LAN mode. Then, after the wireless LAN mode has connected, the processing proceeds to step S606, and the CPU 211 starts the wireless software AP mode, and terminates the processing.

By this, because the wireless software AP mode is started by using the same frequency channel as the frequency channel used by the restarted wireless LAN mode, the frequency channel used in these two modes can be made to be the same.

Figure 9:
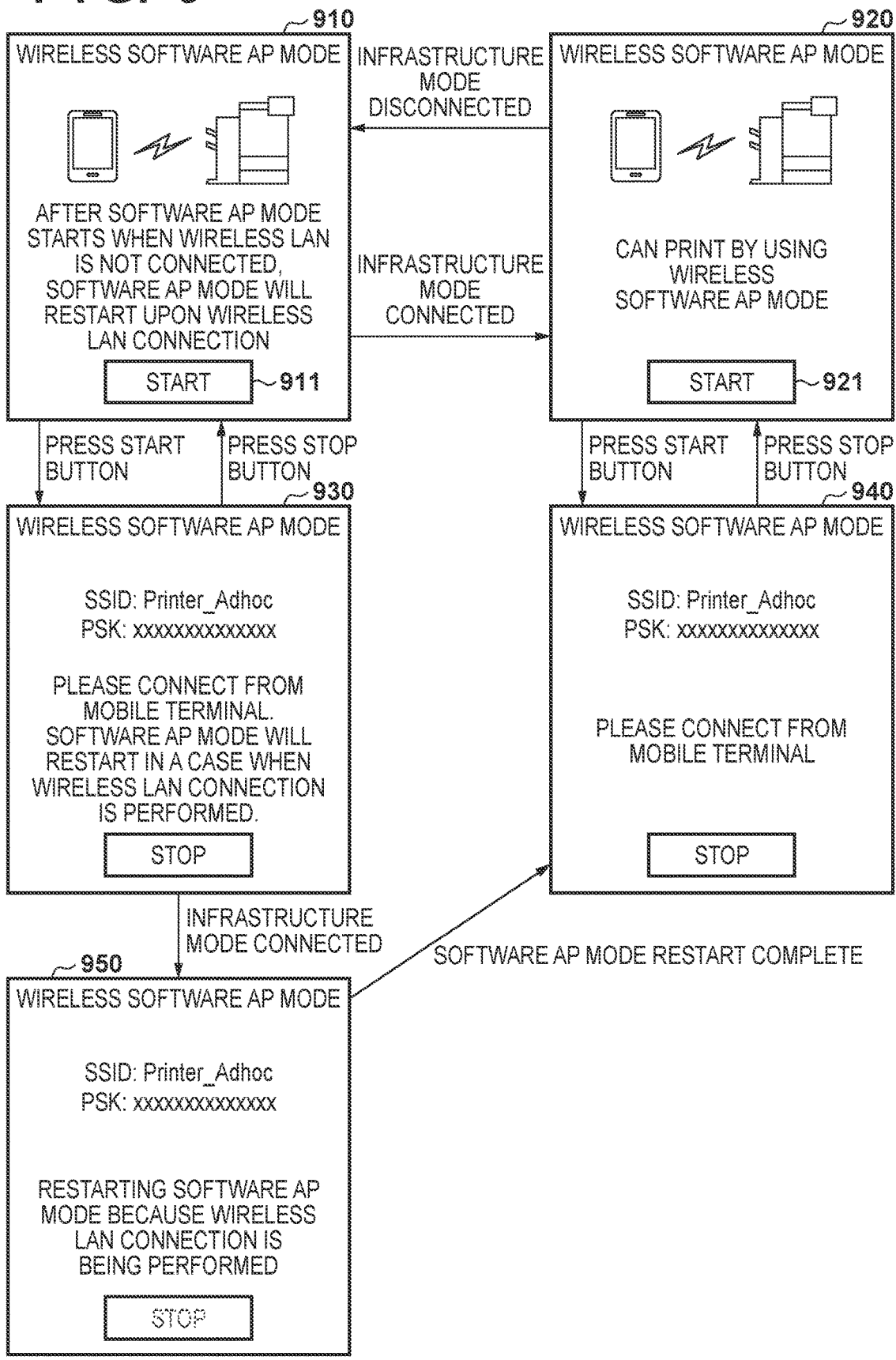
FIG. 9 depicts a view for describing user interface screen transitions in the MFP according to the second embodiment.

FIG. 9 depicts a view for describing user interface screen transitions in the MFP 101 according to the second embodiment.

A transition from the wireless software AP mode screen 910 to the wireless software AP mode screen 920 is performed by transitioning to the wireless LAN mode by connecting in the infrastructure mode from a state in which the wireless LAN mode is not yet connected. In such a case, because the infrastructure mode is transitioned prior to the wireless software AP mode, the frequency channel of the wireless LAN mode and the wireless software AP mode become the same even if a start button 921 is pressed in the screen 920 and the wireless software AP mode is started. Accordingly, the MFP 101 and the mobile terminal 103 can communicate in the wireless software AP mode in a state in which a wireless software AP mode screen 940 is being displayed.

In contrast to this, a wireless software AP mode screen 930 is transitioned to when a wireless software AP mode start button 911 is pressed in the wireless software AP mode screen 910. Also, a wireless software AP mode screen 950 is transitioned to when a connection (infrastructure connection) in the wireless LAN mode is initiated at a time when the wireless software AP mode screen 930 is being displayed. In such a case, there is no guarantee that the frequency channel in the infrastructure mode is the same frequency channel used with the wireless software AP mode because the wireless software AP mode has been started first. Accordingly, the connection processing of the wireless LAN mode temporarily stops in step S603, and the wireless software AP mode stops in step S604 as described with reference to the flowchart of FIG. 6. Also, the wireless software AP mode starts in step S606 after the connection processing of the wireless LAN mode restarts and the infrastructure mode starts in step S605. In this way, the wireless software AP mode screen 940 is transitioned to when the wireless software AP mode restarts.

In conclusion, because there is a possibility that differing frequency channels will arise in the two modes when the wireless software AP mode starts previously and is connected in the infrastructure mode, in the second embodiment as described above, in such a case, the wireless software AP mode and the wireless LAN mode temporarily stop, and after this, the infrastructure mode starts and then the wireless software AP mode starts. By this, it is guaranteed that the same frequency channel will be used in the two modes.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-160217, filed Aug. 17, 2016, which is hereby incorporated by reference herein in its entirety.

What is claimed is:

1. An information processing apparatus including a first communication function for connecting to an external access point to communicate with an external apparatus, and a second communication function for causing the information processing apparatus to operate as a wireless access point and for performing a direct wireless communication with the external apparatus without relaying the external access point, the information processing apparatus comprising:
at least one memory that stores instructions; and
at least one processor that executes the instructions to:
in a state where the information processing apparatus is set to operate the first communication function and a frequency channel for communicating with the external access point in the first communication function is not determined, prohibit the information processing apparatus from being set to operate the second communication function;
in a state where the information processing apparatus is not set to operate the first communication function, permit the information processing apparatus to be set to operate the second communication function; and
in a state where the information processing apparatus is not set to operate as the wireless access point and the frequency channel for communicating with the external access point in the first communication function is determined, start the second communication function to operate the information processing apparatus as the wireless access point for communicating with the external apparatus, using a same frequency channel as the frequency channel used in the first communication function in accordance with receiving a predetermined user operation.

2. The information processing apparatus according to claim 1, wherein the predetermined operation is a user operation of selecting a display object displayed on a display.

3. The information processing apparatus according to claim 2, wherein, in the prohibiting of the information processing apparatus from setting the second communication function, the at least one processor controls the display device to not display a display object for prompting a user to perform the predetermined operation on the display device.

4. The information processing apparatus according to claim 1, further comprising:
a third communication function that provides a different communication method from that of the first communication function,
wherein the at least one processor executes the instructions to permit the information processing apparatus to communicate with the external apparatus using the third communication function regardless of whether or not the information processing apparatus is set to operate the first communication function.

5. The information processing apparatus according to claim 4, wherein the third communication function is a wireless communication function complying with Bluetooth® standard.

6. The information processing apparatus according to claim 1, wherein the information processing apparatus is a printing apparatus that includes a printing device.

7. A method of controlling an information processing apparatus including a first communication function for connecting to an external access point to communicate with an external apparatus, and a second communication function for causing the information processing apparatus to operate as a wireless access point and for performing a direct wireless communication with the external apparatus without relaying the external access point, the method comprising:
in a state where the information processing apparatus is set to operate the first communication function and a frequency channel for communicating with the external access point in the first communication function is not determined, prohibiting the information processing apparatus from being set to operate the second communication function; in a state where the information processing apparatus is not set to operate the first communication function, permitting the information processing apparatus to be set to operate the second communication function; and
in a state where the information processing apparatus is not set to operate as the wireless access point and the frequency channel for communicating with the external access point in the first communication function is determined, starting the second communication function to operate the information processing apparatus as the wireless access point for communicating with the external apparatus, using a same frequency channel as the frequency channel used in the first communication function in accordance with receiving a predetermined user operation.

8. The method according to claim 7, wherein the predetermined operation is a user operation of selecting a display object displayed on a display device.

9. The method according to claim 8, wherein, the prohibiting controls a display device to not display a display object for prompting a user to perform the predetermined user operation on the display device.

10. The method according to claim 7, wherein:
the information processing apparatus further includes a third communication function that provides a different communication method from that of the first communication function, and
the method further comprising communicating with the external apparatus using the third communication function regardless of whether the information processing apparatus is set to operate the first communication function.

11. The method according to claim 10, wherein the third communication function is a wireless communication function complying with Bluetooth® standard.

12. The method according to claim 7, wherein the information processing apparatus is a printing apparatus that includes a printing device.

13. A non-transitory computer-readable storage medium storing a program for causing a processor to execute a method of controlling an information processing apparatus including a first communication function for connecting to an external access point to communicate with an external apparatus, and a second communication function for causing the information processing apparatus to operate as a wireless access point and for performing a direct wireless communication with the external apparatus without relaying the external access point, the method comprising:
in a state where the information processing apparatus is set to operate the first communication function and a frequency channel for communicating with the external access point in the first communication function is not determined, prohibiting the information processing apparatus from being set to operate the second communication function;
in a state where the information processing apparatus is not set to operate the first communication function, permitting the information processing apparatus to be set to operate the second communication function; and
in a state where the information processing apparatus is not set to operate as the wireless access point and the frequency channel for communicating with the external access point in the first communication function is determined, starting the second communication function to operate the information processing apparatus as the wireless access point for communicating with the external apparatus, using a same frequency channel as the frequency channel used in the first communication function in accordance with receiving a predetermined user operation.

* * * * *